United States Patent
Attimont et al.

(10) Patent No.: US 6,947,412 B2
(45) Date of Patent: Sep. 20, 2005

(54) METHOD OF FACILITATING THE PLAYBACK OF SPEECH SIGNALS TRANSMITTED AT THE BEGINNING OF A TELEPHONE CALL ESTABLISHED OVER A PACKET EXCHANGE NETWORK, AND HARDWARE FOR IMPLEMENTING THE METHOD

(75) Inventors: Luc Attimont, Saint Germain en Laye (FR); Jannick Bodin, Garches (FR)

(73) Assignee: Alcatel, Paris (FR)

(*) Notice: Subject to any disclaimer, the term of this patent is extended or adjusted under 35 U.S.C. 154(b) by 826 days.

(21) Appl. No.: 09/739,325

(22) Filed: Dec. 19, 2000

(65) Prior Publication Data
US 2001/0005365 A1 Jun. 28, 2001

(30) Foreign Application Priority Data
Dec. 27, 1999 (FR) .............................. 99 16527

(51) Int. Cl.⁷ .......................... H04L 12/66; G10L 11/06
(52) U.S. Cl. ....................................... 370/353; 704/215
(58) Field of Search ................................. 370/353–356, 370/465–466, 389, 394, 401, 412, 477; 704/215, 201, 210

(56) References Cited

U.S. PATENT DOCUMENTS 5,897,613 A * 4/1999 Chan .......................... 704/210
5,995,491 A * 11/1999 Richter et al. .............. 370/263
6,580,694 B1 * 6/2003 Baker ......................... 370/252
6,621,812 B1 * 9/2003 Chapman et al. ........... 370/346

FOREIGN PATENT DOCUMENTS

EP          0 921 666 A2     6/1999
WO         WO 95/22233       8/1995

* cited by examiner

Primary Examiner—Hassan Kizou
Assistant Examiner—Hong Sol Cho
(74) Attorney, Agent, or Firm—Sughrue Mion, PLLC

(57) ABSTRACT

A method of improving sound playback of digitized speech signals transmitted to a telecommunications terminal at the beginning of a telephone call set up over a communications network where the signals are transmitted in the form of packets, and in particular at the beginning of a VOIP call set up under Internet protocol, at the time said call is set up from a sending telecommunications terminal fitted with voice activity detection means so as to be capable of transmitting only those digitized signal packets that contain speech taken from a set of sound signals that are suitable for being transmitted in the form of packets after the sound has been digitized and encoded in the sending terminal. Signal packets are transmitted from the digitizing and encoding means during an initial call optimization stage without taking account of whether or not any speech signals are present. The invention also provides telecommunications hardware implementing the method.

6 Claims, 1 Drawing Sheet

METHOD OF FACILITATING THE PLAYBACK OF SPEECH SIGNALS TRANSMITTED AT THE BEGINNING OF A TELEPHONE CALL ESTABLISHED OVER A PACKET EXCHANGE NETWORK, AND HARDWARE FOR IMPLEMENTING THE METHOD

The invention relates to a method for facilitating sound playback of digitized sound signals, and more particularly of speech signals transmitted to a telecommunications terminal at the beginning of a telephone call set up over a network in which signals are transmitted in the form of packets, and more particularly a call of the so-called "voice over Internet protocol" (VOIP) kind set up using the Internet protocol. The invention also relates to telecommunications hardware and in particular to terminals designed to enable the method to be implemented to the advantage of users.

BACKGROUND OF THE INVENTION

As is known, setting up a telephone call between users via terminals which are themselves interconnected over a packet transmission network, requires that packets corresponding to the speech signals of the call and established in real time must themselves be transmitted in at least approximately periodic manner so as to make it possible to play back the sound with relatively good fidelity, and in particular so that at least speech is reproduced in a manner that is sufficiently intelligible. Unfortunately, as is known, the transmission of packets between two terminals over a transmission network that is even only lightly loaded does not guarantee that the packets will all be received at their destination at a regular rate corresponding to their encoding times, nor even that they will be received in the same order as they were sent out by the sender. It is quite normal for packets sent from one terminal to another to be delayed relative to other packets in a manner that cannot usefully be forecast at the destination terminal. In addition, there is a risk that transmitted packets can be lost or even duplicated. This therefore leads to the packets that are received by a terminal being stored temporarily as they arrive so as to build up a buffer of packets on which action can be taken to put the packets back into their initial order, in particular after waiting for packets that have been delayed, providing the delay does not exceed some predetermined threshold value, and after eliminating any duplicate packets. It is normally possible to transmit speech signals in digitized form by means of packets over an asynchronous packet exchange network. However, in the event of these signals being speech signals relating to a call set up in real time between two users, that requires timing constraints to be complied with in terms of delay and periodicity so that the signals can be played back as sound at a determined rate, preferably corresponding to the rate at which they were picked up.

Determining the size of the buffer in which packets are temporarily stored as they arrive at a terminal requires a good compromise to be found. If the buffer is too small, then the number of successively recorded packets that are present simultaneously at any given instant is such that it is possible for late packets still not to have been received, and thus stored and reorganized as initially intended, by the time at which they need to be taken into account in the buffer for reproduction in the form of sound. Under such conditions, the sound signals that are played back do not faithfully reproduce the signals that were initially picked up and from which they are derived. The quality of service obtained can become unacceptable and when the sound signals are speech signals they can become difficult to understand. However, if the buffer is large so as to avoid the above-described drawback, then there can be a long time lapse before the received digitized sound signals are reorganized in the initial order, and when the signals are speech signals relating to a telephone call established in real time, this effect becomes perceptible to users. The quality of service can become highly degraded and a telephone call set up under such conditions runs the risk of being difficult for the users in conversation.

It is possible to modify the size of a buffer in an active terminal as a function of the delays suffered by the packets it receives so as to increase buffer size when there are packets arriving too late to be taken into consideration, thereby making it possible subsequently to accept packets that arrive with an equivalent degree of lateness, or to do so merely when the delays to which received packets are subject to increase on average, or indeed when the mean variation between successive delays increases. Such modification can be based, for example, on statistical processing of the delays that have applied to the most recently received packets. It is also possible to reduce the size of a buffer in an active terminal when the arriving packets are received with delays that are smaller than anticipated and/or when the delays measured on the arriving packets lie within a smaller range of delays than the range currently being accommodated.

Such adaptations of buffer size are preferably performed in the destination terminal during a period of silence on the part of the speaker using the sending terminal so as to avoid interfering with the processing of received signal packets that correspond to genuine speech signals, since it is necessary for such packets to be reproduced with the best possible fidelity. As mentioned above, these adaptations can be performed by taking account of delays as observed on the packets most recently received by the terminal. By way of example, the delay of each packet is determined by observing the time at which the packet was sent, as specified by the header of the message containing it, and also its arrival time which is observed using the clock of the terminal where it is received. This makes it possible in particular to take account in variations in loading that occur specifically in the transmission network, and these variations can be particular large for a terminal which is communicating over a network in which the number of calls that are set up simultaneously can vary very quickly, as is the case for the Internet.

A search for a satisfactory compromise using the above-mentioned method is possible only after a sufficient number of messages containing speech signal packets have been received, which means that a certain amount of time must elapse before there is any genuine possibility of matching the size of a receive buffer to a given call. This is made worse by the fact that it is common practice in an established telephone call to transmit sound signal packets from each of the terminals involved only when speech signals are contained in the sound signals available for transmission, and consequently the only signal packets that are actually transmitted are packets that include speech signals. Such a disposition makes it possible significantly to reduce the load on a network since, as a general rule, only one user is speaking at any given instant on a telephone call set up between two users. Furthermore, this makes it possible to avoid transmitting interfering noise and in particular background noise when, temporarily, no speech signals are being picked up at a terminal that is being used by a user who is silent.

When such a disposition is used, there is no way to preselect accurately an appropriate size for the receive buffer at the destination terminal while a call is being set up, in particular when the possible range of delays to which packets can be subject is large for the network over which the calls are being set up, as is indeed the case with the Internet. The quality of service at the time a call is set up thus runs the risk of being poor and the initial speech runs the risk of being unintelligible, e.g. if it is truncated.

OBJECTS AND SUMMARY OF THE INVENTION

The invention thus provides a method of improving sound playback of digitized speech signals transmitted to a telecommunications terminal at the beginning of a telephone call set up over a communications network where the signals are transmitted in the form of packets, and in particular at the beginning of a VOIP call set up under Internet protocol, in the event that said call is set up from a sending telecommunications terminal which is fitted with voice activity detection means so as to be capable of transmitting only those digitized sound signal packets that actually contain speech, which packets are taken from a set of sound signal packets that are available for transmission after the sound has been digitized and encoded in the sending terminal.

According to a characteristic of the invention, the method provides for sound signal packets to be transmitted from the digitizing and encoding means without taking account of the presence or absence of speech signals in the processed sound signals during an initial stage of call optimization.

In the invention, the method further provides for the initial telephone call optimization stage during which digitized sound signal packets are transmitted from a sending terminal without taking account of the presence or absence of speech signals in the processed signals to be of a duration that is selected in such a manner as to enable a receiving terminal to receive a sufficient number of digitized sound signal packets relating to the call to enable the size of the receive buffer for digitized sound signal packets to be determined on the basis of a statistical evaluation of the delays observed on the received packets.

The invention also provides telecommunications hardware, in particular a subscriber terminal or a common terminal, which is connected to a network enabling packets to be exchanged and which is designed to communicate over the network with a compatible terminal by means of digitized sound signal packets including digitized speech signals produced in the context of a VOIP type telephone call that is set up over the network under IP protocol or an equivalent protocol.

According to a characteristic of the invention, this hardware comprises means in a programmed control unit enabling a number of digitized sound signal packets to be transmitted when a telephone call is set up and during an initial optimization stage, said number being sufficient to enable a receiver terminal to determine the size of a receive buffer for digitized sound signal packets by statistically evaluating the delays observed on the received packets, and voice activity determining means enabling digitized sound signals to be transmitted only if they contain speech signals, said voice activity determining means being prevented from acting until the initial optimization stage has terminated.

BRIEF DESCRIPTION OF THE DRAWINGS

The invention, its characteristics and its advantages are described in greater detail below with reference to the following figures.

MORE DETAILED DESCRIPTION

The method of the invention is designed to improve the sound playback of digitized sound signals transmitted to a telecommunications terminal, at the beginning of a telephone call set up over a transmission network over which signals are transmitted in the form of packets. The invention is directed more particularly to playing back speech signals insofar as it is particularly desirable to be able to play back such speech signals with sufficient fidelity and to do so from the beginning of a conversation, for obvious reasons of intelligibility. The method of the invention is intended in particular for implementation in the context of a VOIP call set up using the Internet protocol from a subscriber terminal 1, 1', or 2, via a communications network 3 that transmits information in the form of digital or digitized signal packets. As is known, this network could be the Internet or some public or private network designed to operate under Internet protocol IP or under a protocol which can generally be considered as being functionally equivalent, insofar as it is designed to perform the same kind of functions with means that correspond, at least approximately.

Telecommunications terminals suitable for communicating over the communications network 3 by means of signals relating to information transmitted in packet form can be in a wide variety of forms, and more particularly they can be terminals that correspond to individual subscriber terminals such as 1 and 1' enabling telephone calls to be made between users in the form of conversations and requiring packets to be exchanged between the terminals involved, which packets contain digitized speech signals. Telephone calls in which packets contain digitized signals can also be set up between one or more individual subscriber terminals and a common terminal such as 2, e.g. a terminal constituting a voice call center. Such common terminal could also, for example, be a private branch automatic exchange (PBAX) serving a plurality of individual terminals.

Figure 1:
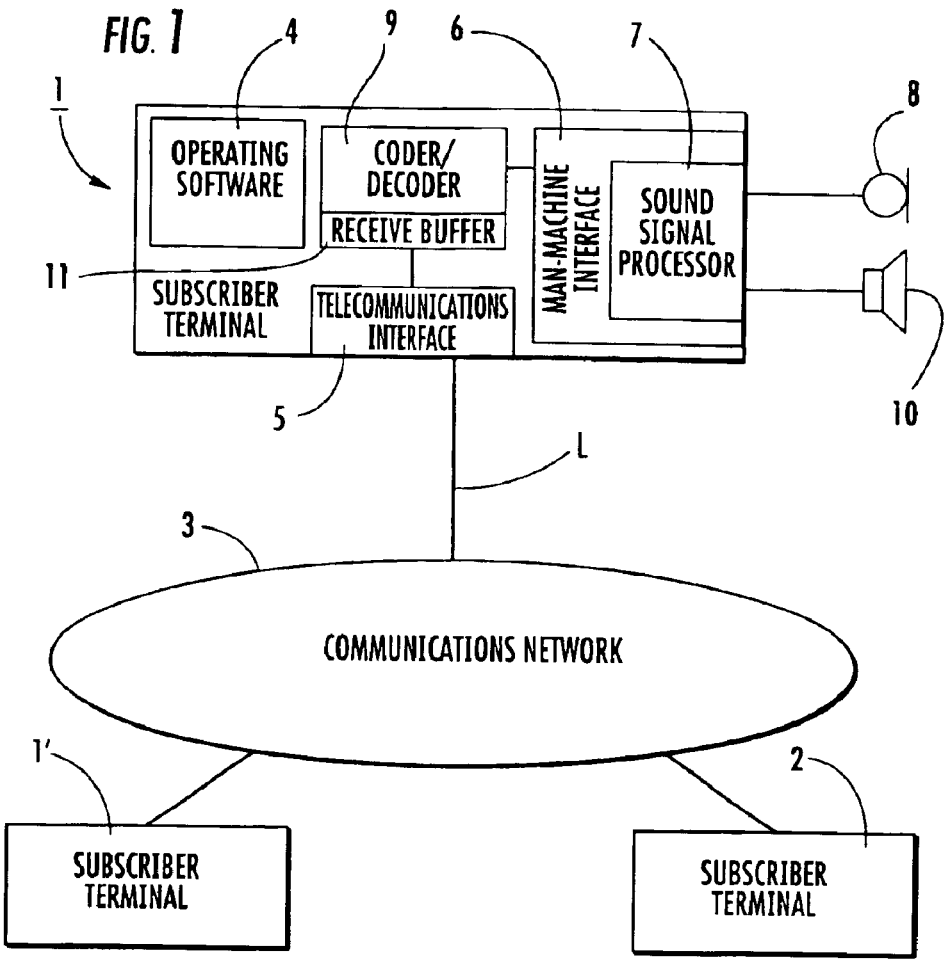
FIG. 1 is a block diagram relating to a communications system organized around a network enabling information to be exchanged in the form of digital or digitized signal packets between telecommunications terminals, and more particularly enabling the method of the invention to be implemented.

One of the above terminals is shown in slightly greater detail in FIG. 1, where this terminal 1 is assumed to be an individual subscriber terminal 1. By way of example, it is connected to the communications network 3 over a link L constituted by a telephone line. By way of example, this terminal is connected to the communications network via a gateway, assumed in this case to correspond to an Internet service provider (ISP). The telephone line thus terminates at a telephone exchange serving said gateway, as is conventional for a terminal connected to the Internet. The link L could equally well be a direct link if the terminal is one that is connected directly to the packet transmission network proper.

The terminal 1 conveniently includes programmed operating software 4 and also includes a telecommunications interface 5. This interface is designed to make it possible to set up an outgoing or an incoming digital data call or digitized sound signal call with some other terminal via the network 3. It is conventionally fitted with a modem connected in series with the link L, if this link is an analog telephone line.

The terminal 1 has a man-machine interface 6 including audio means 7 for processing sound signals, and in particular speech signals picked up by a microphone 8 associated with the terminal, for transmission via the telephone line L after encoding and compression in the form of packets by means of a coder/decoder (codec) 9. The audio means also enable sound to be played back, e.g. by means of a loudspeaker 10, said sound being derived from digitized sound signals and more particularly from digitized speech signals which reach the codec 9 in the form of packets coming over the link L, and which are intended for the user of the terminal 1. Packets coming from the telephone line L are switched in the terminal 1 so as to direct speech signals, after decompression and decoding, to the audio means 7, and to direct data to means (not shown) that are provided for using data. As is conventional, this data can be used, for example, by a telephone application running the man-machine interface 6 and serving, amongst other things, to perform dialing, and to set up or clear down a call. As mentioned above, the digitized sound signal packets that are received are temporarily stored in a receive buffer memory 11 associated with the codec. This receive buffer memory 11 is assumed to be of a size that can be modified according to requirements under the control of the programmed operating software 4 of the terminal containing the buffer, as described in greater detail below.

In a conventional embodiment where the terminal 1 is organized around a computer, the computer has suitable operating system and communications programs, e.g. a browser (not shown) enabling it to send requests that are usually established using the HTTP protocol for making the calls it desires to make with other individual terminals or shared terminals that it can access over the network 3.

Naturally, apparatuses other than computers can be used as user terminals 1, and in particular voice/data telephones, commonly referred to as "screenphones".

Whatever type of equipment is used for a terminal such as 1, 1', or 2, it must have software means enabling it to communicate by means of packets. The packets can contain data or digitized sound signals.

The method of the invention is more particularly intended for use when the digitized sound signals comprise digitized signals relating to speech exchanged during a telephone call, i.e. during a voice conversation established in real time between user terminals.

To this end, it is assumed that each terminal that might be involved in such calls possesses a set of communications control protocols respectively for telephone packets and signals, for data packets and data, and also for transmitting packets over the link L.

Figure 2:
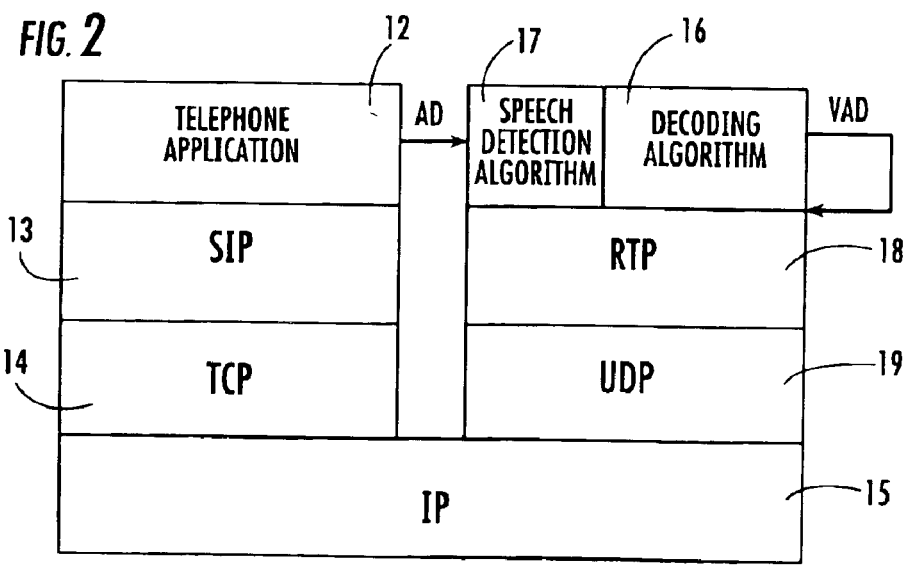
FIG. 2 is a block diagram showing a possible set of protocols involved in implementing the method of the invention.

FIG. 2 shows two protocol stacks standing on a layer 15 that corresponds to IP. One of these stacks corresponds to the telephone application proper, while the other relates to processing digitized sound signals and more particularly speech signals.

The telephone application is controlled via an application layer 12 which is assumed in this case to be in charge of the man-machine interface of the terminal. It enables requests for telephone use to be processed using packets and the communications network, e.g. in order to dial a call, to request that a call be established, to put on hold, to establish a three-way conference, to clear down a call, etc. It originates a signal AD characteristic of an established call corresponding at least approximately to the signal for activating the audio portion when a call is established in a telephone set having programmed control software. This signal AD is assumed to be made active in this case when a call is established between terminals and to remain active until the call is cleared down.

Requests coming from the application layer 12 are processed in a transport layer that combines a telephone protocol 13 and a protocol 14 for transfer to the IP layer. By way of example, these protocols 13 and 14 can be the standardized telephone protocol known as session initialization protocol (SIP), and a standardized transfer protocol known as transmission control protocol (TCP) or user datagram protocol (UDP).

By way of example, the voice codec 9 uses a standardized G723.1 or G729 encoding and decoding algorithm referenced 16 in FIG. 2 in order both to convert speech signals into digitized speech signal packets, with the speech signals being picked up in this case by the microphone 8 of the terminal in the context of a telephone call, and also to play back sound signals and in particular voice signals on the basis of packets that are transmitted to the terminal over the link L. In known manner, the speech signals as picked up are sampled, compressed, and encoded so as to be capable of being sent in the form of packets in periodic manner. A voice activity detection (VAD) signal is produced when the speech signals assumed to be coming from the microphone 8 are being encoded. This activity detection is performed, for example, by means of an algorithm for detecting speech in noise. The digitized speech signal packets obtained by implementing the encoding method are processed in a transport layer e.g. combining two standardized protocols RTP and UDP, given respective references 18 and 19. The UDP protocol defines the starting port for packets as constituted by the codec 9 in the terminal 1 and the arrival port as constituted by the codec in the terminal 1' for digitized sound signal packets and in particular speech signal packets transmitted from the terminal 1 over the link L in this example. In an implementation of the speech encoding algorithm that is implemented for performing the method of the invention, a voice activity detection signal VAD is supplied while the codec 9 is encoding a packet of sound signals for transmission that contains speech signals. The signal VAD is obtained by implementing a speech detection algorithm represented here by reference 17 in the context of the encoding algorithm.

The UDP protocol serves to transfer packets between the RTP protocol and the IP protocol referenced 15 which is used by the terminal for transmitting packets over the network 3 via the link L. In the embodiment considered herein, provision is made for the voice activity detection signal VAD to be applied to the interface between the encoding algorithm and the protocol layer 18 in order to control the sending of the digitized sound signal packets produced during a telephone call concerning a conversation that takes place in real time so that the only digitized sound signal packets that are transmitted are packets which contain speech signals.

In the invention, while a telephone call is being set up, i.e. a call for enabling users to converse in real time, provision is made for digitized sound signals to be transmitted regardless of whether speech signals are present or absent in the processed sound signals, and for this to continue throughout an initial optimization stage of the call. By way of example, this can be achieved by a timer being triggered on the signal AD switching to an active state to indicate that a call is set up. This timer is used to delay the signal VAD and consequently temporarily to allow digitized sound signal packets to be transmitted even if they do not contain speech signals, with this being achieved by acting on the outlet from the encoding algorithm 16.

Thus, for example, during a VOIP type telephone call set up via a terminal 1 accessing the network by means of a link L of the analog telephone type, and thus via a modem (not shown in FIG. 1), provision is made for the beginning of the initial call optimization stage to correspond to the moment at which both terminals to be connected together begin to exchange sound signal packets with each other in the context of the telephone call that has just been set up.

The duration of the initial optimization stage is assumed in this case to be selected to be sufficiently long for there to be a high probability that a terminal to which digitized sound signals are sent will be able to receive a suitable number of digitized sound signal packets in the context of a phone call that is being set up to enable it to determine the appropriate size for its receive buffer. In a predetermined program, this is done by making a selection on the basis of a statistical evaluation of the delays measured on the first digitized sound signal packets to be received. By way of example, the duration of such a stage can be one second and it is assumed to be determined so as to allow some number "N" of packets to be received, where this number is close to 50, for example, when using the G729 encoding algorithm with two blocks of encoded speech being transported in each packet.

As mentioned above, the delay of a packet is easily determined by taking account of the time at which the packet is sent, as indicated by the header of the message containing it, and the time at which it is observed to arrive at the terminal where it is received. The processing algorithm for determining the size of the receive buffer, e.g. 11, on the basis of a statistical evaluation of the delays determined for "N" packets received in succession is not explained herein insofar as it can be implemented on the basis of knowledge that is well known to the person skilled in the art.

The method of the invention enables the size of the receive buffer of a terminal to be adapted at the beginning of a telephone call in which it is involved as a function of the delays that are observed for the initial sound signal packets that it receives and before the user of the terminal has actually begun communicating by voice. This makes it possible to avoid the initial utterances being deformed because of the receive buffer of the receive terminal in question being initially of the wrong size. Once this initial optimization stage is over, provision is made to transmit only those digitized sound signal packets which contain speech signals, by then allowing the voice activity detection means provided in the terminals in communication to act. Naturally, subsequent modifications of receive buffer size can take place at later times while a call is in progress, depending on requirements, for example by taking advantage at one terminal of the time intervals during which the user in conversation remains silent.

The method of the invention can naturally be implemented in various kinds of telecommunications hardware and in particular in individual subscriber terminals such as 1 or 1' in FIG. 1, or in terminals used in common by one or more users, such as 2, as mentioned above. The terminals concerned are those designed for communicating over the network with a compatible terminal by means of digitized signal packets including digitized speech signals produced in the context of a VOIP call or a call of the VOIP kind, as set up over the network under IP protocol or under some equivalent protocol. Such terminals are provided with software and hardware means as defined above when describing the method of the invention.

In an embodiment proposed herein, the terminals for enabling the method of the invention to be implemented are provided with timing means implemented in software or possibly in hardware to act on the voice activity determining means of the terminal so as to ensure that the VAD means come into effect only after the initial optimization stage provided at the beginning of each phone call as set up has terminated. The other terminal in the call can then adapt the size of its own receive buffer as a function of the delays it observes on the first packet it receives in the call and optimize sound playback of the speech signals it receives at the beginning of the call accordingly. The action performed by the timing means can, for example, consist in inhibiting the voice activity detection means in the codec of the terminal temporarily at the beginning of a call and for a determined duration corresponding to the initial optimization stage, so as to enable digitized sound signals to be sent without taking any account of whether or not they contain speech signals. Inhibition of this kind can be implemented at the outlet of the encoding algorithm 16 and by acting on the VAD signal by means of the speech detection algorithm referenced 17 for a VOIP type call.

What is claimed is:

1. A method of improving sound playback of digitized speech signals transmitted to a telecommunications terminal at the beginning of a telephone call set up over a communications network where the signals are transmitted in the form of packets in the event said call is set up from a sending telecommunications terminal comprising voice activity detection means for transmitting only those digitized sound signal packets that contain speech signals, said digitized sound signal packets that contain speech signals are taken from a set of sound signal packets that are available for being transmitted after the sound has been digitized and encoded in the sending terminal, the method comprising transmitting sound signal packets from the digitizing and encoding means without taking account of the presence or absence of speech signals in the processed sound signals during an initial stage of call optimization, wherein the initial telephone call optimization stage during which digitized sound signal packets are transmitted from a sending terminal without taking account of the presence or absence of speech signals in the processed signals is of a duration that is selected in such a manner as to enable a receiving terminal to receive a sufficient number of digitized sound signal packets relating to the call to enable the size of a receive buffer for digitized sound signal packets to be determined on the basis of a statistical evaluation of the delays observed on the received packets.

2. The method according to claim 1, wherein the telephone call set up is a VOIP call set up under Internet protocol.

3. Telecommunications hardware which is connected to a network enabling packets to be exchanged and which is designed to communicate over the network with a compatible terminal by means of digitized sound signal packets including digitized speech signals produced in the context of a VIP type telephone call that is set up over the network under IP protocol or an equivalent protocol, the hardware comprising:

a programmed control unit enabling a number of digitized sound signal packets to be transmitted when a telephone call is set up and during an initial optimization stage having a duration that enables a receiver terminal to receive a sufficient number of the digitized sound signal packets relating to the call to determine the size of a receive buffer for the received digitized sound signal packets by statistically evaluating the delays observed on the received packets; and voice activity determining means enabling digitized sound signals to be transmitted only if said digitized sound signals contain speech signals, said voice activity determining means being prevented from acting until the initial optimization stage has terminated.

4. Telecommunications hardware according to claim 3, wherein said programmed control unit comprises a timing means acting on the voice activity determining means so that said voice activity determining means act only after the end of an initial optimization stage of determined duration.

5. Telecommunications hardware according to claim 4, wherein the timing means acts to temporarily inhibit the action of the voice activity determining means until the end of the initial stage of call optimization.

6. Telecommunication hardware according to claim 3, wherein the telecommunication hardware is a subscriber terminal or a common terminal.

* * * * *